Sept. 23, 1958  C. D. ROBIN ET AL  2,852,914
COMBUSTION CHAMBER SUPPORT MEANS
Filed Dec. 30, 1955  2 Sheets-Sheet 2
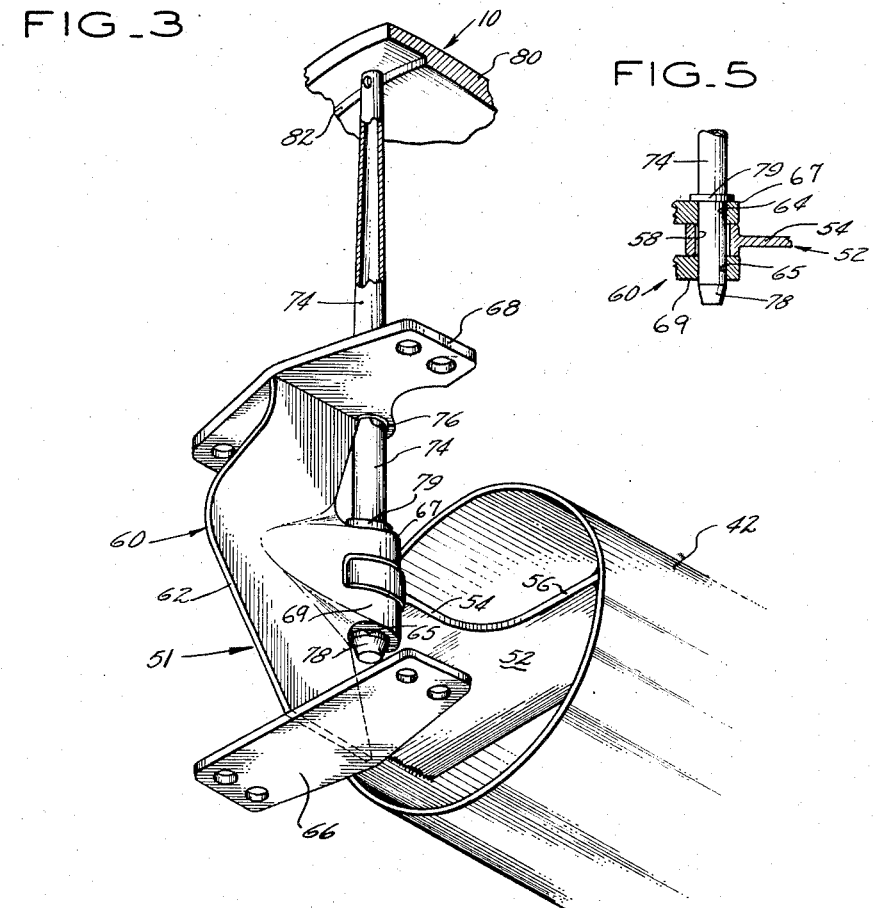
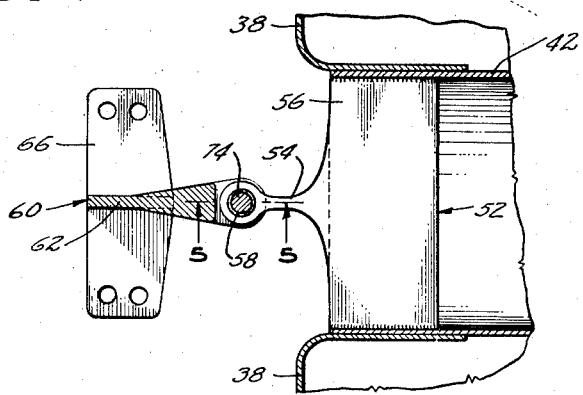
INVENTORS
CHARLES D. ROBIN
PHILIP G. DOOLEY
BY Vernon F. Hauschild
ATTORNEY

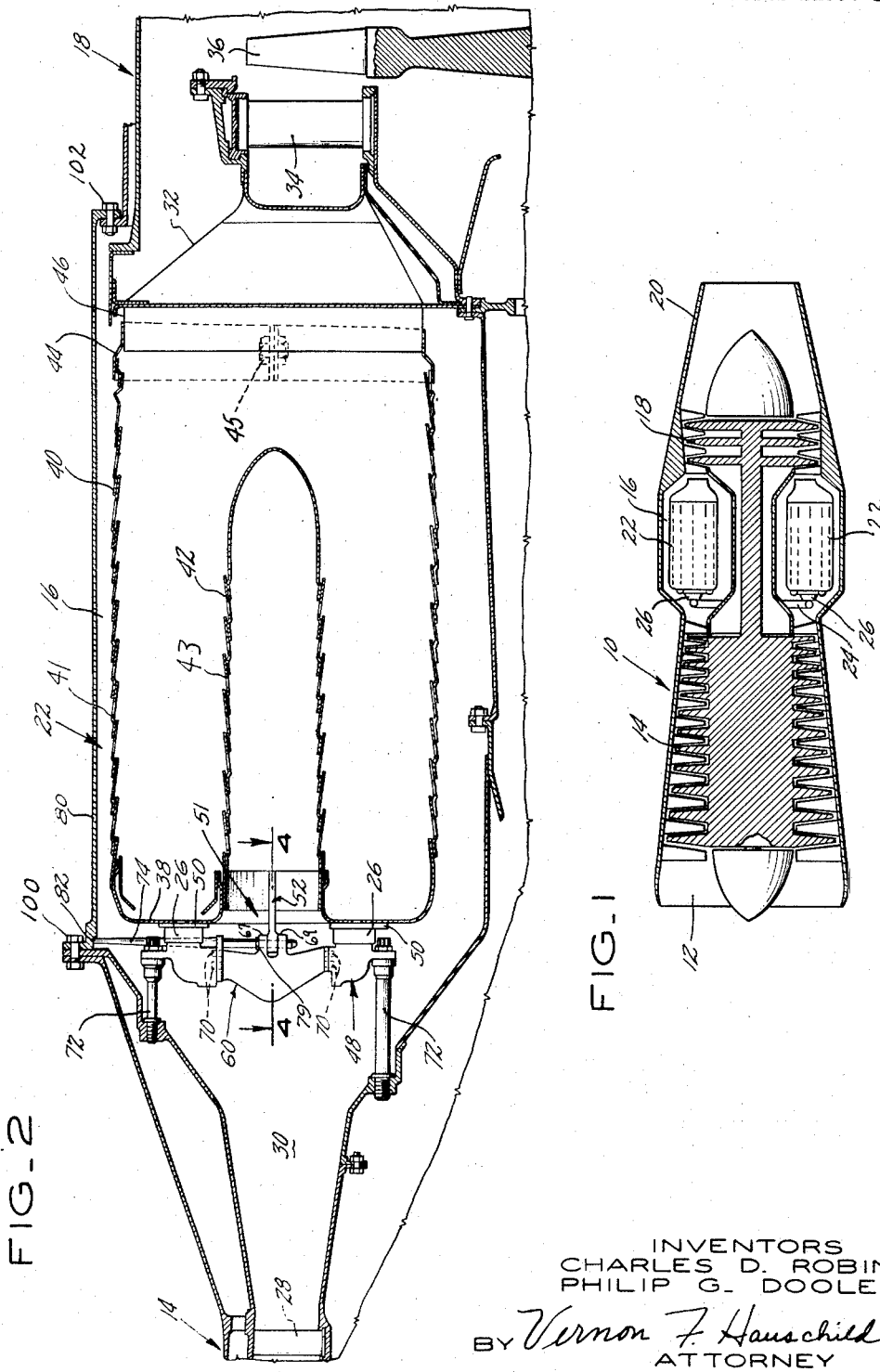

United States Patent Office 2,852,914
Patented Sept. 23, 1958

2,852,914

COMBUSTION CHAMBER SUPPORT MEANS

Charles D. Robin, Glastonbury, and Philip G. Dooley, Bolton, Conn., assignors to United Aircraft Corporation, East Hartford, Conn., a corporation of Delaware Application December 30, 1955, Serial No. 556,733

5 Claims. (Cl. 60—39.31)

This invention relates to a combustion chamber support means and more particularly to the central support of can-type combustion chambers.

It is an object of this invention to provide a combustion chamber support which will so support the combustion chamber that a bending action through eccentric loading is not imposed upon the chamber structure by aerodynamic loading due to power plant gas flow past the combustion chamber.

It is a further object of this invention to provide a combustion chamber support which fixes the combustion chamber with respect to the power plant.

It is still a further object of the present invention to provide combustion chamber support means which is positive in action yet simple in construction, light in weight, and which facilitates ease of assembly and disassembly.

While the applicants chose to show their combustion support means in connection with a typical can-type combustion chamber used in a turbojet aircraft engine, it should be borne in mind that the invention is not necessarily so limited and that it has several other obvious applications. The aircraft turbojet engine use was chosen simply because it represents a workable embodiment.

Referring to the drawings:

Fig. 1 is a cross-sectional view of a typical turbojet power plant.

Fig. 2 is a cross-sectional view of a combustion chamber supported by a preferred embodiment of our invention.

Fig. 3 is a perspective view of our support invention to demonstrate its attachment to the burner and the power plant.

Fig. 4 is a sectional view taken along line 4—4 of Fig. 2.

Fig. 5 is a sectional view taken along line 5—5 of Fig. 4.

Referring to Fig. 1, we see turbojet aircraft power plant 10 consisting of air inlet section 12, compressor section 14, combustion chamber cavity 16, turbine 18, and exhaust duct 20. A plurality of combustion chambers 22 are located within combustion cavity 16 and located between compressor 14 and turbine 18. Combustion chambers 22 are fed fuel by fuel manifold 24 and fuel nozzles 26. Combustion chamber 22 is of the so-called "can" type for it is of sheet metal construction and its axial dimension is greater than its radial dimension.

Air enters the power plant through inlet section 12, is compressed as it passes through compressor 14, is heated in a power generating function as it passes through combustion chamber cavity 16 and combustion chamber 22, and then passes through turbine 18 in a power extraction function and thence is exhausted in jet exhaust fashion through exhaust duct 20.

It is necessary that the combustion chamber 22 be supported axially, circumferentially, and radially in combustion cavity 16 and it is further necessary that it be so supported that the aerodynamic load placed upon it by the passage of air from the compressor section 14 does not cause undue stress through bending loads on the sheet metal combustion chamber 22. It is desirable to support the combustion chamber centrally so that an equal aerodynamic load is applied to the front and sides of the combustion chamber 22 on each side of the support. Our invention is intended to provide this central aerodynamically balanced combustion chamber support and, in accomplishing this function, the amount of bending stress upon the cylindrical sheet metal walls of combustion chamber 22 is reduced. A reaction couple on the convergent section 32 is also eliminated.

Now, referring to Fig. 2, we see that the high pressure gas, which passes through compressor 14 and compressor stationary exit stators 28, passes through transition section 30 thence into combustion cavity 16 and through combustion chamber 22, thence through convergent section 32 into turbine section 18 in which it passes through turbine inlet guide vane 34 and the first-stage turbine rotor 36. It will be obvious that the frontal area 38, presented by combustion chamber 22, must withstand the aerodynamic loading caused by the difference in pressure ahead of the burner front end relative to the pressure inside the burner. In the past, combustion chambers have been supported or fixed axially by joining a single lug or bolt, located in the forward outer periphery of combustion chamber 22 to the outer case 80. If combustion chamber 22 were supported at one point only, as described above, this aerodynamic loading imposes a bending stress on the combustion chamber walls 40 and a reaction couple on the convergent section 32 which tend to cause buckling or distortion of the parts, particularly when they are hot. If combustion chamber 22 is supported centrally, the aerodynamic force against its frontal surface becomes equal on each side of the centrally located support and eliminates the torque or bending force referred to previously. In effect, due to the central support, the sheet metal combustion chamber can be operated at higher temperatures without distortion. The aerodynamic loading of the combustion chamber just mentioned is caused partially by the force of the pressurized air which passes from compressor 14 and strikes the front wall 38 of combustion chamber 22 at a substantial velocity, but mostly by the difference in pressure which exists within combustion cavity 16 outside of combustion chamber 22 and the pressure which exists within combustion chamber 22. This difference in pressure causes a pressure drop across all walls of combustion chamber 22, namely, walls 38, 40, 42. Since the pressure outside of combustion chamber 22 is the greater pressure, the tendency of this aerodynamic loading is to cause combustion chamber 22 to collapse. The walls of combustion chamber 22 must be made sufficiently strong to resist the aerodynamic collapsing load but it is further required that combustion chamber 22 be so supported that the forces exerted upon it not only do not damage the combustion chamber itself but also such that these forces do not cause the combustion chamber to impart injurious loading to other parts with which it comes into contact.

Considering the combustion chamber structure, we see that it consists of sheet metal perforated and corrugated outer wall 40 and sheet metal perforated and corrugated center tube 42. The perforations consist of a plurality of substantially equally spaced holes in wall sections 41 and 43 of chamber walls 40 and 42 and compressed air passes from combustion cavity 16 into combustion chamber 22 therethrough. The downstream end of the combustion chamber, namely, ring 44, engages ring 46 of convergent section 32 in a sliding fit. The sliding fit takes care of differential thermal expansion of the burner can with respect to the rest of the power plant. Ring 44 is made of two 180° ring segments, bolted together, in well-known ring clamp fashion, as shown in phantom on Fig. 2. Bolts or other attachment means 45 connect the two segments of clamp ring 44.

Now referring to the forward end of combustion chamber 22, we see fuel nozzle cluster 48. Fuel nozzle cluster consists of a plurality of fuel nozzles 26, which fuel nozzles are joined through connecting fuel lines to form fuel nozzle cluster 48. As shown in Fig. 1, fuel is supplied to the fuel nozzle cluster 48 and thence to the fuel nozzles 26 through fuel manifold 24. The forward end of combustion chamber 22 engages flange 50 of fuel nozzles 26 in a sliding fit. In view of this sliding fit at the forward end of the combustion chamber and the sliding fit at the after end of the combustion chamber, both just described, unless the combustion chamber was supported axially, the aerodynamic loading of combustion chamber front face 38 by the gases coming from the compressor would cause combustion chamber 22 to move axially downstream. It will be obvious that the engagement of rings 44 and 46 at the after end of combustion chamber 22 and of the forward end of combustion chamber with flanges 50 both radially and circumferentially fix and support combustion chamber 22 with respect to power plant 10.

To this point we have described how combustion chamber 22 is supported both radially and circumferentially. The combustion chamber support, which is the subject matter of our invention in this application, provides the required axial support to combustion chamber 22. Our means for axial positioning or supporting combustion chamber 22 is particularly important and relates directly to our solution of the problem of balancing and withstanding the aerodynamic loading on combustion chamber referred to supra. Our combustion chamber support means 51, which consist basically of paddle-shaped support means 52 and second support means 60, each described in detail later, attaches to combustion chamber 22 at the forward end and centrally of combustion chamber 22 as described hereinafter so as to axially support the combustion chamber. The after end of combustion chamber 22 attaches to transition or convergent section 32 in a sliding fit. The open after end of combustion chamber produces an aerodynamic unbalance such that combustion chamber 22 tends to move axially downstream due to the fact that the exterior surface of wall 38 is loaded to a greater degree than its interior surface. The axial support of the forward end of combustion chamber 22 by support means 51 prevents combustion chamber 22 from moving axially downstream as a whole, and the sliding fit which exists between ring 44 of combustion chamber 22 and transition or convergent section or duct 32 prevents the axial downstream loading of combustion chamber 22 from being imparted to said transition section 32 yet permits axial movement between duct 32 and the after end of combustion chamber 22. Further, because the forward end of combustion chamber 22 attaches to fuel nozzles 26 in an axial sliding fit, the entire axial load on combustion chamber 22 is taken by support means 51. As support means 51 is centrally attached to combustion chamber 22, the aerodynamic loading does not impose a moment and therefore a buckling force on combustion chamber 22 as would be the case if support means 51 were placed off-center with respect to combustion chamber 22.

In the manner just described, support means 51 axially supports combustion chamber 22 such that the aerodynamic loading of combustion chamber 22 has no deleterious effect either upon combustion chamber 22 or the parts which the combustion chamber contacts. It will be seen, as described later, that support means 51 is attached to power plant parts which are chosen to be well able to withstand the axial loads imposed upon them by support means 51.

Now, referring to Figs. 2, 3, and 4, paddle-shaped support means 52, which may be made of a flat piece of metal, consists of handle portion 54 and paddle portion 56. The edges of paddle portion 56 engage or are attached to diametrically opposed surfaces of center tube 42. As shown in Fig. 3, center tube 42 is substantially circular in cross section. This attachment may be made by any convenient means and applicants chose to show it as a welded attachment. The handle portion 54 of this first support means 52 has a centrally located hole 58 located at the end thereof.

A second support means 60 is located radially with respect to power plant 10, and may be a metallic piece of either flat or air-foiled cross section. The second support means 60 consists of web section 62 having aligned holes 64 and 65 in flanges 67 and 69 at the downstream side thereof, which aligned holes 64 and 65 are spaced sufficiently so as to permit hole 58 in handle 54 of first support means 52 to pass therebetween. This second support means also consists of platforms 66 and 68, located at each end of web section 62 and form an angle of substantially 90° with said web section. These platforms, 66 and 68, perform the function of attaching second support means 60 to fuel nozzle cluster 48 by any conventional means such as bolts 70. In turn, fuel nozzle cluster 48 is attached to a structural member of power plant 10 by means of bolt arrangement or other securing means 72. With the downstream holes 64 and 65 of second support means 60 aligned along a radial axis with hole 58 of first support means 52, pin 74 may be passed through a hole 76 in outer platform 68 and thence through the aligned holes in the first and second support means. Shoulder pin 74 will pass but a short distance (as shown at 78) through the aligned holes until the shoulder 79 abuts against the support means 60. Hole 76 is sufficiently large to permit the passage of shoulder 79 therethrough. The outer case 80 of power plant 10 has stepped section 82 which receives pin 74 and prevents pin 74 from backing radially out of engagement with the aligned holes 64, 58 and 65. In this fashion, pin 74 is fixed radially since case 80 prevents radial outward movement of pin 74 and shoulder 79 prevents its radial inward movement. It will be obvious, because of the looseness of fit between hole 58 and pin 74, that a pivotal action is permitted between first support means 52 and second support means 60 about an axis radial to power plant 10. This pivotal action between the support means 52 and 60 prevents thermal or other loads originating in or imparted to parts such as a fuel manifold 24 from being imparted through support means 60 and 52 to combustion chamber 22. The same would occur relative to the imparting of loads from combustion chamber 22 to other parts such as fuel manifold 24. While it is undesirable, combustion chamber 22 may "bow" or otherwise move in a radial or circumferential direction at some point in its length during engine operation. Such frequently occurs during airplane maneuvering and when power plant parts other than and including the combustion chambers, have been damaged. Forces resulting from such occurrences are the type which are likely to be imparted other than as axial loads from combustion chamber 22 to other power plant parts. In short, the prevention of the transmission of other than axial loads between the combustion chamber 22 and other power plant parts is the purpose for the pivotal connection between support means 52 and 60.

As described above, combustion chamber 22 is fixed both radially, circumferentially, and axially but has a degree of pivotal support flexibility thereto.

The combustion chamber support means described in this application facilitates an easy removal of the combustion chamber unit from the power plant. Referring to Fig. 2, to disassemble, we would remove bolts 100 and 102 from outer case 80 and would slide outer case 80 rearwardly or to the right in telescoping fashion until the entire area exterior of combustion chamber 22 is accessible. The bolts of clamp-type ring 44 are then removed which permits the removal of the 180° ring segments of ring 44. With ring 44 removed, there is a substantial axial clearance between combustion chamber 22 and ring 46 of convergent section 32. Also, with case 80 moved rearwardly, pin 74 may be removed from the forward combustion chamber support means 52 and 60. The combustion chamber 22 is now free to move axially but is restrained radially since it is still in engagement with flanges 50 of fuel nozzles 26. By moving combustion chamber 22 downstream slightly, the engagement between the forward end of the combustion chamber and fuel nozzles 26 is broken and it is then possible to lift combustion chamber 22 radially out of power plant 10. This ease of removal of the combustion chamber is highly beneficial since it is a part which needs relatively frequent replacement in a power plant due to its sheet metal construction and its high temperature operation.

While applicants choose to show a particular embodiment of their invention, is should be borne in mind that the invention is not so limited and several obvious applications would occur to those skilled in the art.

We claim:

1. A turbojet power plant of substantially circular cross section having a compressor and a turbine, a combustion cavity connecting said compressor to said turbine and forming a gas flow passage therewith, a combustion chamber of substantially circular cross section located within said combustion cavity and having a central axis parallel to the centerline of said power plant, fuel injection means attached to said power plant and engaging said combustion chamber at a support zone to radially position said combustion chamber with respect to said power plant, first support means attached to diametrically opposite walls of said combustion chamber at said support zone and second support means attaching said first support means to said power plant such that said support means are pivotal with respect to each other about an axis radial to said power plant centerline and such that said support means axially fix said combustion chamber support zone with respect to said fuel injection means.

2. A turbojet power plant of substantially circular cross section having a compressor and a turbine, a combustion cavity connecting said compressor to said turbine and forming a gas flow passage therewith, a combustion chamber located within said combustion cavity and having a forward and an aft end and further having a central axis parallel to the centerline of said power plant and further having a coaxial centrally located center tube of circular cross section extending from said combustion chamber forward end rearwardly, first radial support means engaging said combustion chamber aft end to radially fix same while permitting axial motion thereof, second radial support means fixedly attached to said power plant and engaging said combustion chamber forward end to radially fix same, first axial support means centrally attached to diametrically opposite walls of said center tube forward end and second axial support means attaching said first axial support means to said power plant such that said axial support means are pivotal with respect to each other about an axis radial to said power plant centerline and such that said first and second axial support means support said combustion chamber forward end in fixed axial position with respect to said power plant.

3. A turbojet power plant having a combustion chamber with a centrally located center tube wherein said power plant, combustion chamber and center tube are of substantially circular cross section, fuel conduit means attached to said power plant and said combustion chamber and positioned to provide fuel to and support said combustion chamber radially with respect to said power plant, first support means centrally attached to the forward end of said center tube and second support means attaching said first support means to said fuel conduit means such that said support means are pivotal with respect to each other about an axis radial to said power plant and such that said first and second support means support said combustion chamber axially in said power plant.

4. A turbojet power plant of substantially circular cross section comprising a compressor, a turbine and a combustion cavity forming a gas passage with said compressor and said turbine, a combustion chamber located in said combustion cavity and having a centrally located center tube, the axis of said combustion chamber and said center tube being common and parallel to the centerline of said power plant, fuel conduit means attached to said power plant and positioned to provide fuel to and radially fix the front end of said combustion chamber, clamp means connecting the after end of said combustion chamber to said turbine thereby radially fixing the after end of said combustion chamber while permitting said combustion chamber after end to move axially with respect to said turbine, means to axially fix said combustion chamber forward end comprising a first support unit comprising a paddle-shaped piece having a handle portion and a paddle portion with a radially directed centrally located hole in the end of the handle portion thereof, said paddle portion of said first support unit attached to diametrically opposed surfaces of said center tube forward end and further comprising a second support unit having a strut extending radially of said power plant and having a support platform at each end thereof and further having at least one radially directed hole in the downstream portion thereof adapted to align along a radial axis with said hole in said first support unit, means to attach said support platforms to said conduit means, and means to pivotally attach said first support means to said second support means along a radial axis.

5. A turbojet power plant of substantially circular cross-section having a compressor, turbine and a combustion cavity, said combustion cavity joining said compressor and said turbine and forming a gas passage therewith, a duct projecting forward from said turbine and into said combustion cavity and ending in a ring in said combustion cavity, a combustion chamber located within said combustion cavity and having a centrally located center tube, the axis of said combustion chamber and said center tube being common and parallel to the centerline of said power plant, demountable clamp means radially and circumferentially fixing the rear end of said combustion chamber by joining the rear end of said combustion chamber to said ring in an axially sliding fit, fuel conduit means attached to said power plant and positioned to provide fuel to said combustion chamber, a fuel nozzle attached to said fuel conduit means and having a flange thereon with a cylindrical surface, said flange engaging the forward end of said combustion chamber in an axially sliding fit and thereby radially and circumferentially fixing the forward end of said combustion chamber, first support means comprising a paddle-shaped piece with a handle portion and paddle portion, a centrally located hole in the end of said handle portion, said paddle portion of said first support means attached to diametrically opposed surfaces of the forward end of said center tube, second support means comprising a strut extending radially of said power plant and having a support platform at each end thereof and further having at least one hole in the downstream portion thereof adapted to align with said hole in said first support means along a radial axis, means to attach said support platforms to said conduit means, and means to attach said first support means to said second support means to axially fix said combustion chamber in said power plant such that said support means are pivotal with respect to one another about an axis radial to said power plant, said last means comprising a radially directed rod supported at its outer end by said power plant and passing through said aligned holes and received loosely in said first support means hole.

References Cited in the file of this patent

UNITED STATES PATENTS

| | | |
|---|---|---|
| 2,511,432 | Feilden | June 13, 1950 |
| 2,686,401 | Newcomb | Aug. 17, 1954 |